United States Patent [19]
Pizzorno

[11] 4,116,596
[45] Sep. 26, 1978

[54] CONTRACTIBLE SEGMENTED RIGID CORE FOR A TIRE-CURING MOLD

[75] Inventor: Augusto Pizzorno, Milan, Italy

[73] Assignee: Industrie Pirelli S.p.A., Milan, Italy

[21] Appl. No.: 830,826

[22] Filed: Sep. 6, 1977

[30] Foreign Application Priority Data

Sep. 22, 1976 [IT] Italy .................. 27471 A/76

[51] Int. Cl.² .............................................. B29H 5/18
[52] U.S. Cl. ........................................ 425/55; 425/35; 425/56
[58] Field of Search ............... 425/54, 55, 57, 49, 425/56

[56] References Cited

U.S. PATENT DOCUMENTS

| | | |
|---|---|---|
| 1,389,441 | 8/1921 | DeMattia ........................ 425/54 X |
| 1,429,957 | 9/1922 | Mason .............................. 425/57 |
| 3,784,338 | 1/1974 | Previati ........................... 425/54 X |
| 3,994,650 | 11/1976 | Nishimura et al. ............... 425/55 X |
| 4,063,861 | 12/1977 | Schmidt et al. ................. 425/56 X |

Primary Examiner—J. Howard Flint, Jr.
Attorney, Agent, or Firm—Stevens, Davis, Miller & Mosher

[57] ABSTRACT

A contractible segmented rigid core of a tire-curing mold is disclosed comprising a plurality of sectors, and means which permit a reduction of the transversal dimensions of the sectors to facilitate removal thereof from the cured tire, said means comprising forming each of the sectors in three parts transversely of the mold, one a central part provided with means for producing a movement under the action of resistant elastic or resilient biasing means along the symmetrical plane of the sector, and two lateral parts being adapted to oscillate, in contrast with the elastic or resilient biasing means, with respect to an axis in the symmetrical plane of the sector and thereby having reduced transversal dimensions. Means are included for preventing any displacement of the sectors when in their expanded position relative to the parts which comprise them, no matter what stresses may be applied to them during the tire curing operation.

2 Claims, 9 Drawing Figures

CONTRACTIBLE SEGMENTED RIGID CORE FOR A TIRE-CURING MOLD

The present invention relates to a segmented rigid core for a tire-curing mold.

As is already well known, the external surface of a rigid core for a tire-curing mold has the same form and dimensions as the internal surface that is desired to be given to the cured tire. In the case of the conventional type of tires—i.e., the type having sidewalls with the concavity turned towards the inside, and with the tread width being lesser than the distance between the two sidewalls—the least distance of the facing surfaces of the tire is to be found localized in coincidence with the beads.

In the case of tires having the tread of a greater width with regard to the other facing parts (i.e., the sidewalls and/or the beads) and in particular in the case of tires having sidewalls with their convexity turned towards the inside, the least distance to be found existing between the facing surfaces of the tire is located in coincidence with either the beads, or the sidewalls.

Since, after a tire has been cured—regardless of the type of tire—the rigid core has to be extracted from it, difficulties arise in the operation of removing the said rigid core because of the shape of the rigid core, and indeed the very shape of the tire itself.

The known rigid cores for curing the above-mentioned tires are formed of a plurality of sectors, each of which is a single block. In order to extract the said sectors, and hence, the rigid core from the tire, the latter—regardless of its type—is deformed by drawing apart the beads until the minimum distance existing between the sidewalls and/or beads of the tire, have the same width as the maximum width of the sectors.

By carrying out such an operation on a tire just after it has been cured—and hence when it is still hot—owing to the considerable deformation which the tire must be subjected to, there exists the danger of provoking ruptures or permanent deformations in the tire itself.

The aim of this present invention is to extract the rigid core of a tire-curing mold from an already cured tire—of any of the types cited above—without subjecting the said tire to any practical deformation; and in any case, to subject the tire to a deformation the value of which induces quite negligible tire stresses with respect to the mechanical resistance of the material out of which the tire is made.

The object of the present invention is a contractible segmented rigid core of a tire-curing mold, characterized by the fact that it provides means which readily permit a reduction of the transversal dimensions of the sectors of the rigid core.

The present invention will be still better understood from the following detailed description which refers, merely by way of non-limiting example, to the accompanying drawings where:

Figure 1:
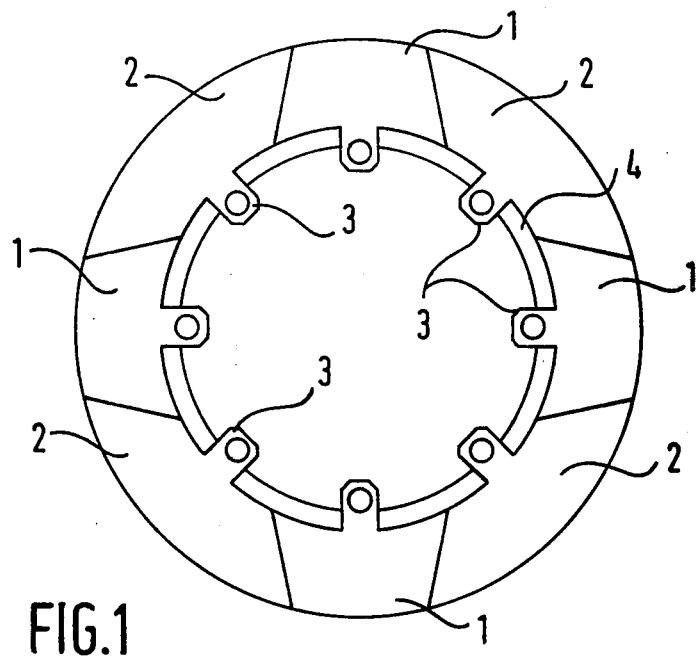
FIG. 1 shows a plan view of a segmented rigid core according to the present invention.

In FIG. 1 is shown a contractible segmented rigid core according to the present invention, for curing tires, wherein the convexity of the sidewalls is turned towards the inside of the tire; and where said rigid core comprises a plurality of two types of sectors 1 and 2. The sectors 1 have in their circumferential direction a lesser development than that of the sectors 2, and present faces which come into contact with the sectors 2 that are divergent with respect to the symmetrical axis of the rigid core. Conversely, the sectors 2 present faces which come into contact with the sectors 1 that converge towards the symmetrical axis of the said rigid core. Moreover, each sector is provided with tangs 3 which connect with a device (not shown) which is known per se, by means of which the operations of contracting and expanding the rigid core are carried out.

As can be seen moreover in FIG. 1, in correspondence with the radially innermost surface of the sectors 1 and 2 there are rings 4 which, between them, block or hold the sectors 1 and 2 in the expanded position of the rigid core.

Figure 2:
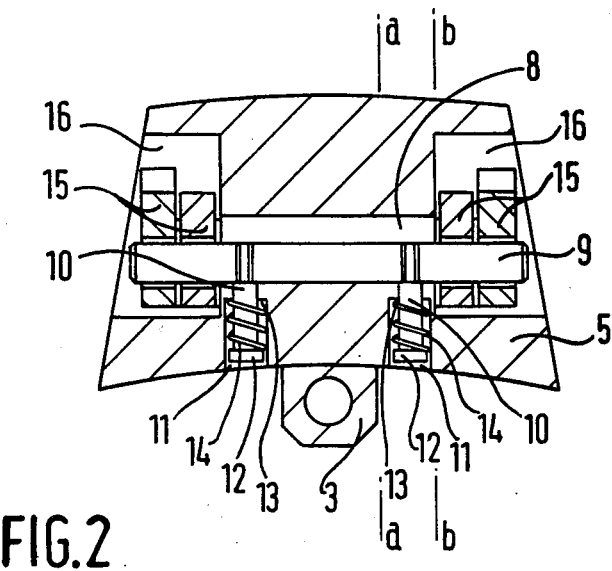
FIG. 2 shows a longitudinal cross-sectional view of a sector of the rigid core, taken along the symmetrical axis c—c of FIG. 3.
Figure 3:
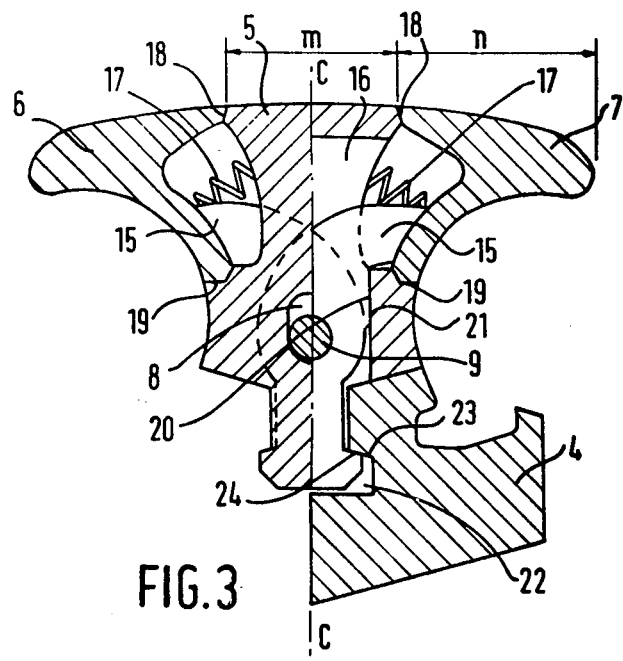
FIG. 3 shows a radial cross-sectional view of the rigid core of FIG. 2, where the part on the right of the drawing is the section taken along the broken-line b—b of FIG. 2; and the part on the left of the drawing is the cross-section taken along the broken line a—a of FIG. 2.

Both the sectors 1 as well as the sectors 2 are formed of three parts—each one mobile with respect to the others, and in contrast with resistant elastic means. In FIGS. 2 and 3 there is shown this type of sector marked with the reference numeral 1 in FIG. 1.

As can be seen in FIGS. 2 and 3, each sector is formed with a central part 5, and with two lateral parts 6 and 7 having a sickle shape.

The central part 5 is symmetrical with respect to the plane of symmetry of the sector. It includes the tang 3 of the sector, and is provided with a hole 8 which is elongated in the direction of the plane of symmetry of the said sector.

Inside the elongated hole or slot 8, there is housed a shaft 9 from which depend pivots 10, perpendicular to its axis, which are housed in cavities 11 made in the part 5 of the sector (see FIG. 2). Between the extremity 12 of each of the pivots 10 —furthest away from the shaft 9—and the base 13 of the cavity 11, there is interposed a spring 14. These springs 14 provide elastic or resilient means resistant to the movement of the central part 5 of the sector in the axial direction of the sector itself.

On the shaft 9 are hinged arms 15 that are fixed to the lateral sickle-shaped parts 6 and 7 of the sector. Within the central part 5 housings 16 are provided for said arms 15.

Moreover, between the lateral sickle-shaped parts 6 and 7 of the sector and the central part 5 of the same sector springs 17 are provided. These springs 17 constitute elastic or resilient means resistant to the oscillating movement of said lateral sickle-shaped parts 6 and 7 of a sector with respect to the axis of the shaft 9 which is contained in the plane of symmetry of the sector itself.

As can be seen from FIG. 3, the sector being in the expanded position, the contact between the central part 5 and the lateral sickle-shaped parts 6 and 7 takes place along the surfaces 18 and 19, and the arms 15 in contact with the lateral sickle-shaped parts 6 and 7 lean with their face 20 on the surface 21 of the housing 16 (see also FIG. 2) made in the central part 5.

Moreover, the rings 4 include a slot 22 which has a surface 23 suitable for contacting a surface 24 belonging to the arms 15 when the sector is in the expanded position. The surfaces 19, 20, 21, 23 and 24 comprise a particular form of embodiment of the locking means which permit the expanded sectors to maintain their relative positions, no matter what stresses may be applied to the sectors themselves.

From the description of the sector given above, it will be readily apparent that the surface of the sectors which is destined to come into contact with the internal surface of the tire corresponding to the crown, although it is a continuous surface, is subdivided into three zones; more precisely, a central zone defined by the surface of the central parts 5 of the sectors; and two lateral zones defined by the equal surfaces of the lateral parts 6 and 7 of the sectors—see the top of FIG. 3.

The most appropriate ratio between the amplitude or width $m$ of the central zone 5 and the amplitude or width $n$ of each lateral zone is between 0.4 and 2, and preferably 0.9.

With the rigid core in the expanded position, the sectors that comprise it are also in an expanded position, i.e., in the position shown in FIG. 3, and in this condition the various parts cannot alter their relative positions irrespective of the value of the stresses that may be applied to the said parts.

As a matter of fact, the surfaces 19 prevent any relative movements between the central part 5 and the lateral parts 6 and 7 along the symmetrical axis $c—c$ of the sector in the direction of the symmetrical axis of the rigid core. The surfaces 20 of the arms 15, when the sectors are in the expanded position, prevent relative rotation between the central part 5 and the lateral parts 6 and 7 while drawing away from the central part 5. The ring 4, besides preventing relative displacement between the sectors, blocks further between them the different parts of the sectors; in particular, by means of the surface 23 of the said ring, which couples with the surface 24 belonging to the arms 15, said ring prevents relative movement, along the axis $c—c$ between the central part 5, and the lateral parts 6 and 7, towards the outside.

Figure 4:
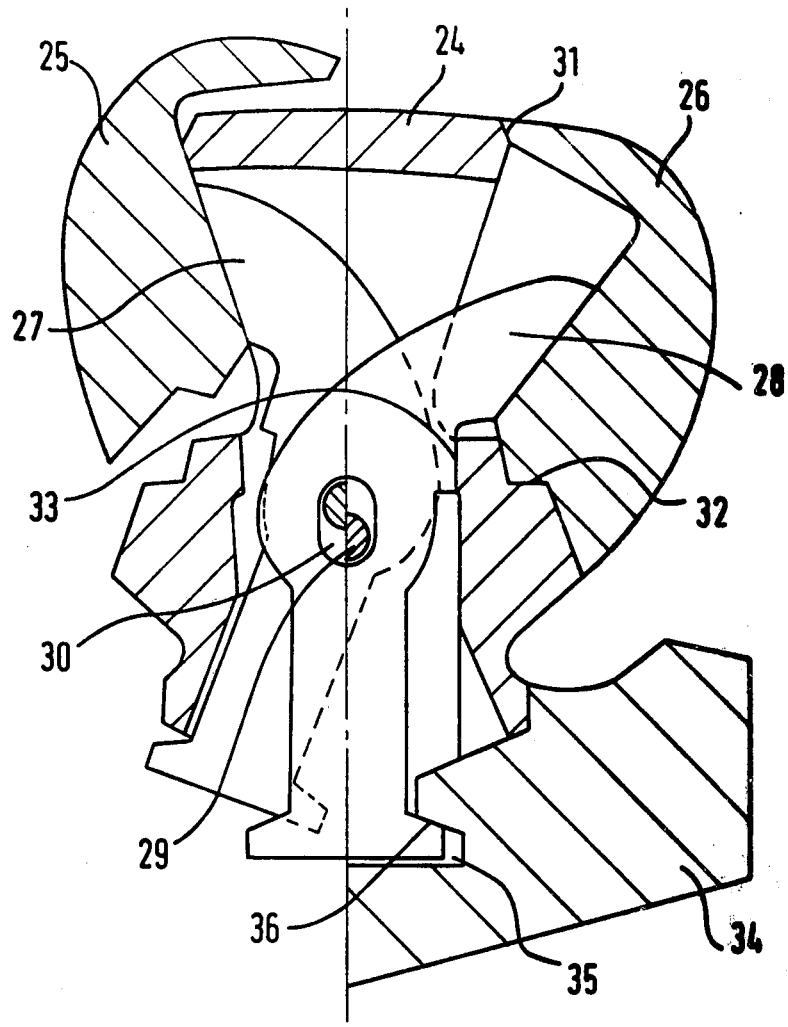
FIG. 4 shows a radial cross-sectional view of an alternative embodiment of a sector of a segmented rigid core according to this invention, where the part to the right of the drawing represents the sector in its expanded position; and the part to the left of the design represents the sector in its contracted position.

FIG. 4 is shown a radial cross-section of a rigid core sector, according to the invention, in an alternative embodiment that is particularly suitable for curing tires of the conventional type.

As can be seen in FIG. 4, the sector shown therein comprises a central part 24, and two lateral parts 25 and 26 in the form of sickles. Fixed to the lateral parts 25 and 26 respectively, are the arms 27 and 28—both hinged to a shaft 29 that passes through the elongated cavity 30 made inside the central part 24.

In the embodiment shown in FIG. 4, for providing the sliding movement of the shaft 29 inside the cavity 30 springs (not shown) are provided which are identical to those marked with the reference numeral 14 in FIG. 2. Moreover, although not represented for the sake of clarity, between the central part 24 and the lateral parts 25 and 26 springs are provided of the type marked with the reference numeral 17 in FIG. 3.

Also in the embodiment represented in FIG. 4, the contact between the central part 24 and the lateral parts 25 and 26, with the sectors in the expanded position, occurs along the surfaces 31 and 32 which prevent relative movement between the parts in the direction parallel to the axis of symmetry of the sector; and moreover, always with the sectors in the expanded position, the arms 27 and 28 lean with their surface 33 against a similar surface that is present in the central part 24, preventing rotation of the lateral parts with respect to the central part.

Finally, even in the embodiment of FIG. 4 there is provided a ring 34 having a slot 35 suitable for coming into contact—when the sectors are in the expanded position—with a surface 36 belonging to the arms 27 and 28, and the said ring 34, besides preventing relative displacement between the sectors, blocks furthermore between them the different parts of the sectors themselves.

Figure 5:
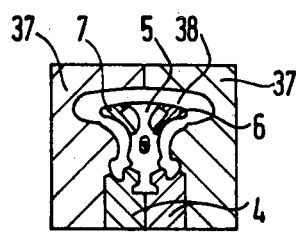
FIGS. 5 to 9 show (in order) the various working positions of a sector schematically represented, during the extracting operation of the said sector from the tire.

The functioning of the contractible segmented rigid core according to the present invention is as follows: In FIG. 5 is shown a mold for curing tires, provided with a rigid core, according to the invention—where for simplification there are only indicated the parts which intervene during the expanding and the contracting of the sectors, when the curing process has been terminated.

As can be seen in FIG. 5, the mold comprises two half-molds 37 which, together with the rigid core, define a hollow space inside which the cured tire 38 is disposed.

For extracting the tire 38 from the mold, the half-molds 37 and the ring 4 are first drawn apart, and then the central part 5 of the sectors 1, is subjected to a downward force 39.

Figure 6:
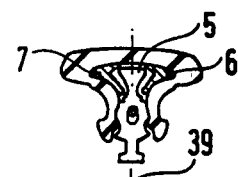

Under the action of this force, by first overcoming the resistance of the springs 14 (FIG. 2) the central part 5 of the sectors 1 slides towards the lateral parts 6 and 7. The situation at this point is illustrated in FIG. 6.

Figure 7:

By continuing to apply the downward force 39 to the sectors 1, the lateral parts 6 and 7 of the said sectors are subjected —by the internal surface of the tire sidewalls—to an action which thrusts them one against the other, and said lateral parts 6 and 7 draw closer to each other, reducing to the minimum the maximum width of the sectors 1. The situation at this point is illustrated in FIG. 7.

Figure 8:

By continuing to apply the downward force 39, the sectors 1 in their contracted transversal dimensions draw apart from the sectors 2 of the rigid core, and lead out or are pulled out from the tire as shown in FIG. 8.

Figure 9:
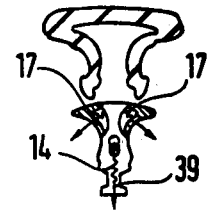

As the sectors 1 are drawn out of the tire, the springs 14 and 17 return the said sectors 1 back to the original configuration which they had in the rigid core assembled within the mold. The situation at this point is illustrated in FIG. 9.

Within the tire there now remain the sectors 2, which are constructed identically to the sectors 1. For extracting the said sectors 2 from the tire, the same operations are carried out as for sectors 1.

From the description of the de-composable or contractible segmented core of a tire curing mold according to the present invention, it is easy to comprehend how the objectives of the invention are achieved.

The provision of a rigid core formed by a plurality of sectors, each of which is formed by three distinct parts (one central, and two lateral) the latter arranged so as to draw back together again, constitutes a desirable embodiment of a means which allow a reduction in the transversal dimensions of a sector.

With the reducing of the transversal dimensions in each of the sectors at the moment in which the sector is to be extracted from the tire, it is possible to carry out the extraction of the said sector without forcing practically any serious deformations of the tire. Hence it is possible to eliminate the danger of causing ruptures or permanent distortions in the tire itself.

I claim:

1. A contractible segmented rigid core of a tire-curing mold, comprising a plurality of sectors, and means which permit a reduction of the transversal dimensions of the sectors to facilitate removal thereof from the cured tire, said means which permit the reduction of the transversal dimensions of the sectors comprise forming each of the sectors in three parts transversely of the mold, one a central part provided with means for producing a movement under the action of resistant elastic or resilient biasing means along the symmetrical plane of the sector, and two lateral parts being adapted to oscillate, in contrast with the elastic or resilient biasing means, with respect to an axis in the symmetrical plane of the sector and thereby having reduced transversal dimensions.

2. A segmented rigid core as in claim 1, including means for preventing displacement of the sectors when in their expanded position relative to the parts which comprise them, no matter what stresses may be applied to them during the tire curing operation.

* * * * *

UNITED STATES PATENT AND TRADEMARK OFFICE
CERTIFICATE OF CORRECTION

PATENT NO. : 4,116,596
DATED : September 26, 1978
INVENTOR(S) : AUGUSTO PIZZORNO It is certified that error appears in the above-identified patent and that said Letters Patent are hereby corrected as shown below:

In the specification, Column 3, line 24, delete "m" and insert -- $\underline{m}$ --; line 25, delete "n" and insert -- $\underline{n}$ --.

Column 3, line 49, before "FIG. 4" insert -- In --.

Signed and Sealed this

Twelfth Day of June 1979

[SEAL]

Attest:

RUTH C. MASON
Attesting Officer

DONALD W. BANNER
Commissioner of Patents and Trademarks